US004001618B2

United States Statutory Invention Registration [19]

[11] Reg. Number: H1618

Blume

[45] Published: Dec. 3, 1996

[54] COHERENT ARRAYS OF DRIFTING SONOBUOYS

[75] Inventor: Richard J. Blume, Alexandria, Va.

[73] Assignee: United States of America, Washington, D.C.

[21] Appl. No.: 453,422

[22] Filed: May 30, 1995

[51] Int. Cl.[6] ..... H04R 23/00; H04B 1/59

[52] U.S. Cl. ..... 367/5; 367/125; 367/129; 367/153

[58] Field of Search ..... 367/5:125, 120, 367/153

*Primary Examiner*—J. Woodrow Eldred

*Attorney, Agent, or Firm*—Thomas E. McDonnell; Charles J. Stockstill

[57] ABSTRACT

By incorporating a Global Positioning System (GPS) receiver into the electronics of an active or passive sonobuoy for determining a geoposition of each sonobuoy comprising an array of sonobuoys or a sonobuoy field, the position of each sonobuoy can be ascertained as the original position of the line of sonobuoys forming the array changes due to wind, sea state and currents. The GPS geoposition of the individual sonobuoys is transmitted to as receiving vehicle along with the acoustic signal obtained by the sonobuoy sensor. Utilizing an onboard computer, the receiving vehicle can compute a synthesized coherent array position. The military P(Y) code transmitted by the GPS satellites is utilized to determine the geoposition of the sonobuoy relative to the other sonobuoys to a degree of accuracy of 2 to 3 meters. If the use is by a civilian activity, the civilian coarse access (C/A) code may also be utilized with a decrease in individual sonobuoy accuracy to 100 meters, however, by application of a broadcast correction, the degree of accuracy obtained utilizing the military P(Y) code can be achieved.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COHERENT ARRAYS OF DRIFTING SONOBUOYS

BACKGROUND OF THE INVENTION

1. Field of the Invention

This invention relates to sonobuoy arrays and in particular to sonobuoy arrays having a global positioning system (GPS) receiver in each sonobuoy for determining the true position of the sonobuoys in the array.

2. Description of the Related Art

Sonobuoy array, or field, consisting of a plurality of individual sonobuoys are dropped in the open ocean in patterns typically numbering from about 20 to 32 sonobuoys from either aircraft or ships. Upon reaching the water, each sonobuoy floats on the surface, lowers a hydrophone to a predetermined depth, and broadcasts its hydrophone output, each on a separate frequency, to a remotely located receiver on the dispensing vehicle. These are called passive sonobuoys. The receiving vehicle simultaneously receives the transmission of all the sonobuoys in the array and produces a plot showing which sonobuoy hydrophones are producing strong acoustic responses and which hydrophones are producing weak responses. Utilizing this plot, an analysis can locate the submerged source of the sound.

Initially the sonobuoys are placed in the ocean at equal intervals along a straight line, technically, a segment of a geodesic. After a time lapse of minutes to a few hours after the sonobuoys are placed in the ocean, the sonobuoys drift from their original positions along the straight line as the result of wind, ocean currents, and sea state. As a result, the sonobuoys no longer form a well-defined pattern in the water. The acoustic signals they broadcast become difficult to correctly interpret because of the dispersion of the individual sonobuoys makes it difficult to properly position the location of the underwater sound source. Even though the sonobuoys may still have battery power and not yet have reached the time for self-destruction, the array has reached the end of its useful life for the accurate detection and location of acoustic sound sources.

SUMMARY OF THE INVENTION

The object of this invention is to provide a means for the accurate determination of the geoposition of a sonobuoy in the open sea so that the drift of individual sonobuoys in an array after deployment may be determined.

Another objective of this invention is provide a method for extending the useful life of an array of sonobuoys.

A further objective of this invention is to provide a means for locating specific sonobuoys so that they may be recovered and refurbished for reuse.

These objectives and others are accomplished by the incorporation of a Global Positioning System (GPS) receiver for determining a geoposition of each sonobuoy comprising an array of sonobuoys or a sonobuoy field. As the original position of the line of sonobuoys changes due to wind, sea state and currents, the GPS geoposition of the individual sonobuoys are transmitted to a receiving vehicle and a synthesized coherent array position can be calculated.

DESCRIPTION OF THE PREFERRED EMBODIMENT

The present invention utilizes Global Positioning system (GPS) satellites for determining the exact position of a sonobuoy.

Figure 1:
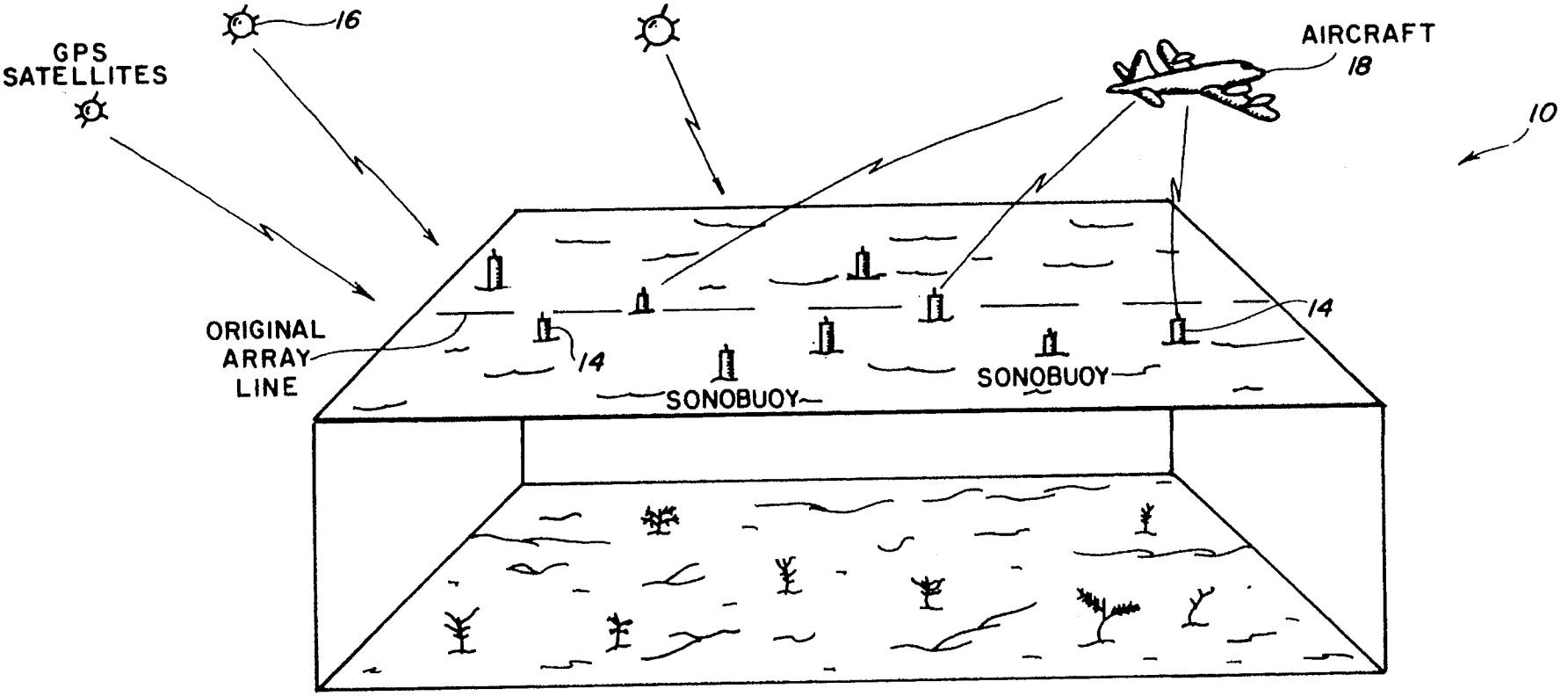
FIG. 1 is a sketch depicting the use of a array of sonobuoys.

In the preferred embodiment, as shown in FIG. 1, the array consists of a plurality of sonobuoys 14, nominally between 20 to 32, positioned along a line so as to form a pattern. Each sonobuoy 14 in the array is equipped with a GPS receiver receiving positional information from orbiting GPS satellites 16 or other receiver of a satellite navigation service of similar capability. The position of each sonobuoy 14 within the array is transmitted to a receiving vehicle, such as an aircraft, 18, where the information is processed and each bit of transmitted data is compared to all other data received and recorded for future analysis.

Figure 2:
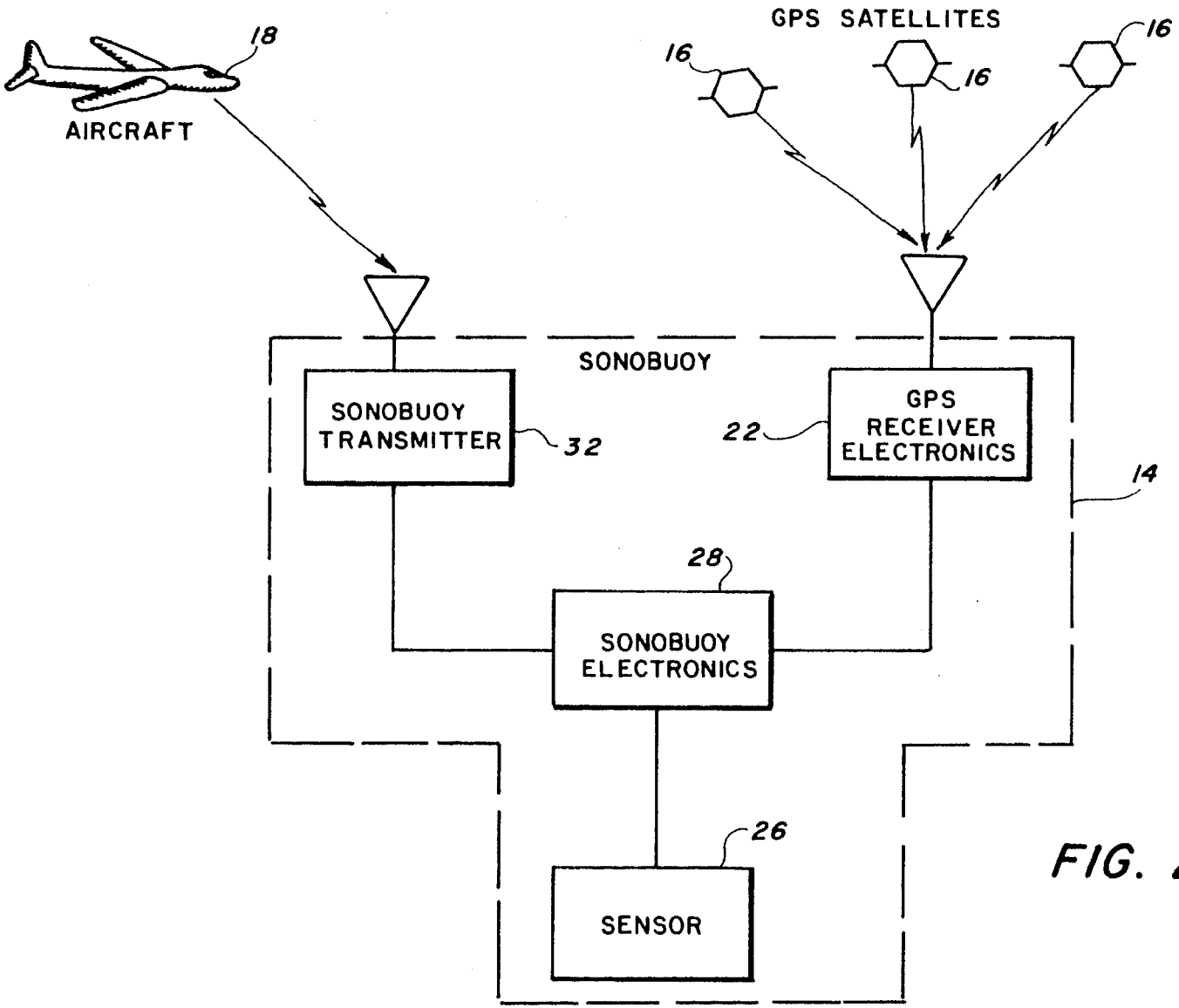
FIG. 2 is a diagram of a sonobuoy having a Global Positioning System (GPS) receiver incorporated into the hydrophone electronics.

Referring now to FIG. 2, each sonobuoy 14 is equipped with a GPS receiver 22 whose positional information from the GPS satellites 16 is combined with the acoustical information obtained by a sensor 26 in a hydrophone electronics package 28 and transmitted by the hydrophone transmitter 32 to the receiving vehicle 18.

In military applications, the GPS receiver 22 utilizes the precise military anti-spoof code called the P(Y) code for determining with absolute accuracy the geoposition of any particular sonobuoy within the array by the use of any one such GPS receiver 22 relative to the World Geodetic System 1984 (WGS-84) or successor system to an accuracy of 16 meters circular error probability (CEP). However, the relative accuracy among any cluster of nearby GPS receivers is about 3 meters CEP or less. "Nearby" in this context means up to several tens of meters apart. Under favorable conditions, the relative geoposition accuracy of 3 meters or less is retained even when the GPS receivers are several hundred meters apart.

Assuming that the sonobuoys 14 forming the array are searching for acoustic signals in the water at a frequency of 50 Hz, the acoustic wavelength $\lambda$ times the frequency f is a constant, the velocity of sound in water, which here is assumed to be 5000 feet/sec or 1,524.4 meters/sec. Thus, $\lambda$ for 50 Hz in water is $$\lambda = \frac{1{,}524.4 \text{ meters/sec}}{50 \text{ Hz}} = 30.5 \text{ meters}$$

However, each sonobuoy 14 equipped with the GPS receiver 22 using the P(Y) code transmits its position relative to other sonobuoys 14 in the vicinity to within 3 meters, or one-tenth the acoustic wavelength in the water of 50 Hz.

The sonobuoy 14, in addition to broadcasting the hydrophone information, now includes its precise GPS position according to the P(Y) code. The platform, such as an aircraft, 18 receives the separate sonobuoy 14 signals and can synthesize a coherent sonobuoy 14 array even though the individual sonobuoys 14 have drifted from their original position into what would normally appear to be a jumbled pattern. Utilizing the GPS position, the precise location of each sonobuoy 14 continues to be known to one-tenth of the wavelength of 50 Hz in water, relative to other sonobuoys 14 in the array. A computer (not shown) in the receiving platform 18 receives the separate outputs of the sonobuoy 14 hydrophone information, along with the geoposition of the individual sonobuoys 14, can synthesize the coherent array. The term "coherent" as used herein implies that the phase of the 50 Hz audio signal at each sonobuoy 14 is included in the calculations leading to the synthesis of the array. Without precise knowledge of the sonobuoy 14 position provided by the GPS receiver 22, only the amplitude of the audio signal received by the sonobuoy 14 is useful, relative to the audio signals received by the other sonobuoys 14 in an array, and not the phase.

Utilizing the "civilian" code called coarse access (C/A) or standard positioning service (SPS), the GPS signal is intentionally jittered by the U.S. Department of Defense to limit absolute geopositioning accuracy to roughly 100 meters CEP relative to WGS-84. The "jittering" is called "selective availability" or SA. The 100 meters CEP may be improved by precisely surveying a fixed site for a GPS receiver 22, comparing the precisely surveyed coordinates of the site with the coordinates derived through the use of the GPS, and then continuously broadcasting the corrections, called differential GPS corrections, locally on any convenient frequency. The result is much improved real-time GPS accuracy for those users who receive the C/A code with SA, and are equipped to apply the broadcast correction. Instead of 100 meters accuracy, 2 to 3 meters accuracy may be obtained.

The U.S. Coast Guard broadcasts differential corrections (DGPS) on the on-shore low-frequency non-directional radio beacons. These signals can be heard out to approximately 150 miles at sea. Utilizing the DGPS, receiving vehicles 18 that are seaborne may utilized this invention as well as airborne receivers 18.

Differential corrections allow GPS receivers 22 to obtain high relative accuracy without requiring that all GPS receivers 22 in the vicinity use the same overhead satellites 16 at the same time.

Differential GPS corrections may be derived on the ground and sent up to satellites 18 which will transmit them over a wide area on earth. This program is called wide area augmentation service (WAAS).

The accuracy of GPS position measurements to centimeters, by making use of the radio frequency (rf) phase of the transmission from each GPS satellite may be accomplished. These rf phase methods refine sonobuoy array synthesis the better than 2 to 3 meters.

Utilizing a coherent synthesized array of drifting sonobuoys 14 the acoustic beam or beams may be synthesized in specified directions or cause the synthesized acoustic beam to rotate slowly in azimuth, or to execute any other specified movement. A coherent synthesized coherent array will yield a better signal-to-noise ratio than an incoherent array of equivalent dimensions and therefore detect a target at longer range. Better angular discrimination may be achieved in the synthesized coherency sonobuoy 14 array than in incoherent arrays of similar size and geometry.

Measurements made by an array of GPS-equipped drifting sonobuoys 14 may be readily calibrated by dropping a calibrator sonobuoy equipped with a GPS receiver 22, preferably in the far field of the array. On radio command, the calibrator sonobuoy 14 emits a calibration signal to calibrate the passive array of sonobuoys 14, at a predetermined depth or depths, and reports its geolocation as measured by its on-board GPS receiver 22. The geolocation of the calibrator sonobuoy 14, as measured by the passive array, is then compared with the GPS-measured location of the calibrator sonobuoy 14, and appropriate corrections applied.

Sonobuoys 14 that know and transmit their relative positions to within a fraction of the wavelength of sound may be active as well as passive sonobuoys 14. Being that the precise location of each GPS-equipped sonobuoy 14 in an array is known to a receiving vehicle 18, active arrays are capable of being synthesized. The geoposition of each sonobuoy 14 in the array is known and its time is correct to within 100 nanoseconds. Each active sonobuoy 14 can be instructed by a central processor when to emit an acoustic signal and the combined acoustic output of the array may be combined into an acoustic beam oriented in a predetermined direction for receiving or transmitting. For an active sonobuoy array, a GPS-equipped calibrator sonobuoy 14 provides a passive listening point of precisely known geolocation allowing optimization of the relative acoustic phasing and amplitude of emissions from the individual active sonobuoys 14 as they drift free.

The individual sonobuoy with an operating GPS receiver knows where it is and the correct date and time, therefore, it can be commanded to turn on and off according to its particular geoposition and the date-time. Further, by including a digital map in the sonobuoy memory, the sonobuoy can be programmed to automatically sink itself if it drifts near or into a specified area.

The sonobuoy 14 array may be either monostatic or bistatic. That is, a given array of sonobuoys 14 may be entirely passive, or entirely active, or a combination of active and passive, alternatively. Or one array in a plurality of arrays may transmit and another array may passively listen, then the arrays may exchange roles following a preprogrammed sequence.

Utilizing the technique described in this invention, the useful life of the sonobuoy 14 array may be extended because their drift can accurately be determined. Also, because the precise location of each sonobuoy 14 is known, sonobuoys 14 may be recovered and refurbished for future use. GPS-equipped sonobuoys dropped into a region at different times by different aircraft may be combined into an array, providing the geoposition of each sonobuoy is known.

Although the invention has been described in relation to exemplary preferred embodiments thereof, it will be understood by those skilled in this art that still other variations and modifications can be effected in these preferred embodiments without detracting from the scope and spirit of the invention.

What is claimed is:

1. A sonobuoy capable of broadcasting a sonobuoy geoposition comprising:

a plurality of sonobuoys forming a line of sonobuoys;

means for receiving a geoposition of an individual sonobuoy in the line of sonobuoys from Global Positioning System (GPS) satellites;

means for sensing an acoustic noise generated by an object submerged within a medium;

means for converting the acoustic noise into an electromagnetic signal;

means for combining the electrical signal and the geoposition of the sonobuoy to form a combined electrical signal; and means for transmitting the combined electrical signal to a receiving vehicle for analysis to determine a synthesized coherent array pattern of the line of sonobuoys.

2. A sonobuoy, as in claim 1, wherein the sonobuoy is an active sonobuoy.

3. A sonobuoy, as in claim 1, wherein the sonobuoy is a passive sonobuoy.

4. A method for compensating for the drift of a line of active or passive sonobuoys in the open ocean, comprising the steps of:

receiving a geoposition of an individual sonobuoy in the line of sonobuoys from Global Positioning System (GPS) satellites;

sensing an acoustic noise generated by an object submerged within a medium;

converting the acoustic noise into an electromagnetic signal;

combining the electrical signal and the geoposition of the sonobuoy to form a combined electrical signal;

transmitting the combined electrical signal to a receiving vehicle; and analyzing a received combined electrical signal to determine a synthesized coherent array pattern of the original line of sonobuoys to compensate for drift due to wind and sea state.

* * * * *